(12) United States Patent
Chandrasekar et al.

(10) Patent No.: US 8,407,209 B2
(45) Date of Patent: Mar. 26, 2013

(54) UTILIZING PATH IDS FOR NAME AND NAMESPACE SEARCHES

(75) Inventors: Sivasankaran Chandrasekar, Menlo Park, CA (US); Asha Tarachandani, Newark, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 900 days.

(21) Appl. No.: 12/178,368

(22) Filed: Jul. 23, 2008

(65) Prior Publication Data

US 2010/0023478 A1    Jan. 28, 2010

(51) Int. Cl.
*G06F 17/30*    (2006.01)
(52) U.S. Cl. .................. 707/718; 707/715; 707/736
(58) Field of Classification Search .............. 707/705, 707/715, 736, 716, 718
See application file for complete search history.

(56) References Cited

U.S. PATENT DOCUMENTS

| | | | | |
|---|---|---|---|---|
| 6,330,573 B1* | 12/2001 | Salisbury et al. | | 715/234 |
| 6,427,123 B1* | 7/2002 | Sedlar | | 702/2 |
| 6,636,845 B2* | 10/2003 | Chau et al. | | 707/769 |
| 6,643,633 B2* | 11/2003 | Chau et al. | | 707/769 |
| 6,772,350 B1* | 8/2004 | Belani et al. | | 726/2 |
| 7,139,746 B2* | 11/2006 | Shin et al. | | 707/736 |
| 7,315,852 B2* | 1/2008 | Balmin et al. | | 707/715 |
| 2002/0123993 A1* | 9/2002 | Chau et al. | | 707/723 |
| 2002/0133484 A1* | 9/2002 | Chau et al. | | 707/769 |
| 2004/0167904 A1* | 8/2004 | Wen et al. | | 707/802 |
| 2005/0091188 A1* | 4/2005 | Pal et al. | | 707/705 |

OTHER PUBLICATIONS

Deutsch, Alin et al., "Reformulation of XML Queries and Constraints", Proceedings of the 9th International Conference on Database Theory, ICDT 2003, pp. 225-241, ACM Digital Library.*
Krishnaprasad, Muralidhar et al., "Query Rewrite for XML in Oracle XML DB", , Proceedings of the 13th International Conference on Very large data bases, vol. 30, pp. 1134-1145, Proceeding VLDB 2004, ACM Digital Library.*

* cited by examiner

*Primary Examiner* — Shahid Alam
(74) *Attorney, Agent, or Firm* — Hickman Palermo Truong Becker Bingham Wong LLP

(57) ABSTRACT

In a database system, names and namespace of XML nodes are computed from path ids. The path ids are constructed from tokens, each of which represents a particular name or namespace-name pair.

16 Claims, 3 Drawing Sheets

Computing a query that requires computing a namespace or name of a certain node of nodes stored in a collection of XML documents

↓ 305

Rewrite the query to cause computing a namespace or name based on said certain path id of said certain node.

↓ 310

Execute query

UTILIZING PATH IDS FOR NAME AND NAMESPACE SEARCHES

RELATED APPLICATION

This application is related to U.S. application Ser. No. 10/884,311, entitled Index For Accessing XML Data, filed on Jul. 2, 2004 by Sivasankaran Chandrasekar, et al., and issued as U.S. Pat. No. 7,499,915 on Mar. 3, 2009, the contents of which are herein incorporated by reference in their entirety for all purposes.

This application is related to U.S. application Ser. No. 10/944,170, entitled Efficient Query Processing Of XML Data Using XML Index, filed on Sep. 16, 2004 by Ashish Thusoo, et al., and issued as U.S. Pat. No. 7,398,265 on Jul. 8, 2008, the contents of which are herein incorporated by reference in their entirety for all purposes.

FIELD OF THE INVENTION

The present invention relates to database systems, and in particular, to optimization of queries that access XML data stored in a database system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

XQuery is a standard language designed for querying of XML data. The standard is promulgated by the World Wide Web Consortium (W3C). XQuery defines many features of a computer language, including functions. Among these functions are fn:name and fn:namespace-uri.

The function fn:name returns the name of a root node of an XML fragment; the function fn:namespace-uri returns the namespace of the root node. The following XML fragments are used to illustrate these functions.

| XML Sequence A |
|---|
| <r:a> |
|    <r:b>.........</b> |
|    <r:c>......... .</c> |
| </a> |

| XML Sequence A |
|---|
| <aa> |
|    <b>............... . .</b> |
|    <d>............... . .</d> |
| <aa> |

The following XQuery query of XML Sequence A uses fn:fname: /a/*/fn:name ( ). The results returned are:

| a |
|---|
| aa |

The following XQuery query of XML Sequence A uses fn:name space-uri: /a/*/fn:namespace-uri ( ). The results returned are:

| r |
|---|
| NULL |

Other languages and environments for accessing XML data have similar functions. For example, the Oracle server product supports a data type for XML data entitled XMLType. The data type is associated with function method that returns a namespace, i.e. XMLType.getnamespace ( ).

The functions that return a name or namespace of a node are referred to herein as a node-name function or a namespace function, respectively. Described herein are techniques for computing such functions efficiently under certain circumstances.

Overview

A node name or namespace is determined based on a token-based path id of a node. A token-based path id represents a path based on a concatenation of tokens, each token representing a particular namespace and node name of the node or an ascendant of the node in the node's path. A token based path id is referred to herein as a path id.

Path ids may require less data to represent a path than a textual representation of the path, and are therefore used in XML databases to represent paths of nodes. Databases may contain data structures used to compute queries of XML data and often contain path ids but not the textual representation of a path. The ability to compute a node-name or namespace function from data available in such structures allows such computation to forego more expensive means of computing the functions, such as materializing an XML fragment to extract a node-name or namespace therein.

Token Taken Table

Figure 1:
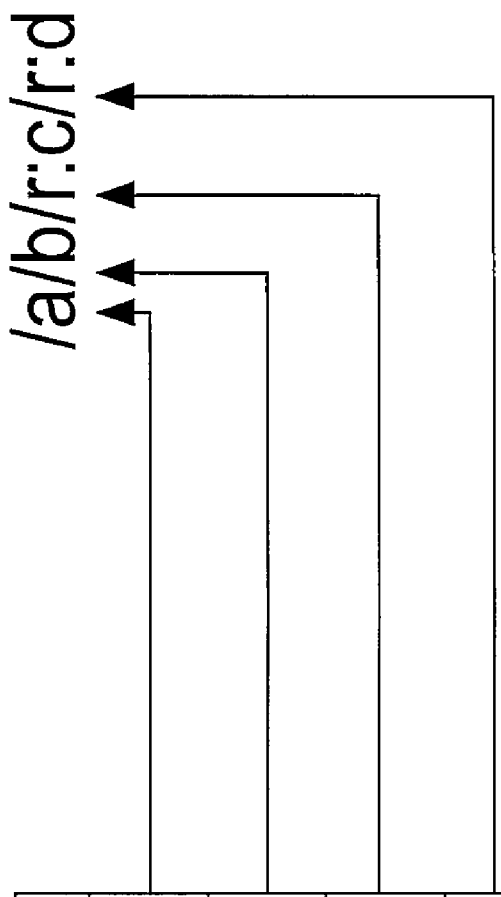
FIG. 1 is a diagram depicting a path id and path table according to an embodiment of the present invention.

According to an embodiment of the present invention, the tokens that comprise path ids are mapped to names and namespace-name combinations by a token table. FIG. 1 shows an example of a token table and is used to illustrate how such a table is used to map tokens.

Referring to FIG. 1, it shows token table 100 and entries that are used to map tokens of a path id for illustrative path expression /a/b/r:c/r:d. Token table 100 includes columns NAMESPACE, NAME, and TOKEN.

Each entry in token table 100 maps a token in column TOKEN to either a node name or namespace-name pair specified in columns NAMESPACE and NAME. The first entry maps name a to token value 5. The second entry maps name b to token value 23. The next entries map a namespace-name pair to a token value because the entries contain non-null values in column NAMESPACE. The third maps namespace-name pair r:c to token value 47. The fourth entry maps r:d to token value 42.

The path id of a node is formed by concatenating the token mapped to the node names in the path, in the order of respective node names in the path. Thus the path id of /a/b/r:c/r:d is 5.23.47.42.

Reverse Look-Up

Token table 100 is used to look up a token value given a particular name or namespace-name pair. However, token table 100 may also be used in reverse to look up a particular namespace and or name of a node given the path id of the node.

For example, the element r:d has the aforementioned path id 5.23.47.42. The path is a concatenation of tokens, the last of which is 42, which corresponds to the namespace-name pair of element r:d. Token table 100 may be looked up to find the entry of token value 42, which is mapped to namespace r and name d. If the element name is desired, the name a is returned for the look-up. If the element namespace is desired, then the namespace r is returned.

XML Index Use Case

As mentioned before, databases may contain data structures used to compute queries of XML data. The data structures may contain path ids. A reverse lookup on the path id in a token table may be to used compute a node name and/or namespace, thereby reducing the computational cost of a query. An "XML index" is an example of such an index.

Queries of XML data may be rewritten to refer to such XML indexes. Rewriting of such queries to more efficiently compute a node name or namespace from the path ids stored in the XML index is an example of how computational costs may be reduced using a reverse lookup on a path id. A short description of an example environment in which such benefits may be achieved is useful.

Storage and Querying Systems for XML

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML data are referred to herein as base tables or objects.

Such database servers include many mechanisms that allow for powerful and efficient ways to query large collections of XML documents. Database servers that store XML documents may be enhanced to efficiently perform XML operations using these mechanisms. One such type of XML operation is to execute queries over collections of XML documents using XML query languages, such as XQuery/XPath. XML Query Language ("XQuery") and XML Path Language ("XPath") are important standards for a query language, which can be used in conjunction with SQL to express a large variety of useful queries. The term XML query is used to refer to queries that conform to (1) XQuery, XPath, and/or another XML language standard, (2) SQL queries that may embed XQuery or XPath expressions, (3) queries of other languages, and (4) proprietary dialects of XQuery, XPath, SQL, or XML standard languages.

A database server may maintain a "logical index", referred to herein as a XML index, that indexes a collection of XML documents. A logical index contains multiple structures that are cooperatively used to access a collection XML documents. According to an embodiment of the present invention, a logical index includes a path table, which contains information about the hierarchies of nodes in a collection XML documents and may contain the value of the nodes. Among the columns or attributes of the path table is a column that stores the path id of nodes. The XML index is described in greater detail in *Index For Accessing XML Data*.

When a database server receives a XML query, the database server may rewrite the query to refer to the underlying database structures that store the XML data. Such rewrites may include rewriting the query to refer to the data structures (e.g. path table) of the XML index. Because the XML index contains path ids, queries that request node names and/or namespaces may be rewritten to derive the name and/or namespace from the data structures of the XML index. This may avoid more costly means for generating names and/or namespaces.

XML Index Rewrite Using Functions

According to an embodiment of the present invention, queries are rewritten to refer to an XML index and functions that (1) return a node name or namespace (2) take as input a path id. The implementation of the functions use the aforementioned reverse lookup to determine the name and/or namespace of a node based on a path ID associated with the node. According to an embodiment of the present invention, the function invocations have the form:

PATH_GET_NAME (path ID); returns node name
PATH_GET_NAMEspace (path ID); returns name space The following query QA is used to illustrate a query rewrite that uses these functions.

```
SELECT ...
FROM ...
WHERE  XML.getNamespace( )  =  'myNamespace'
```

Query QA is rewritten to QA', as follows:

```
SELECT ..
FROM ...
WHERE (select PATHID_GET_NAMESPACE( path ID )
    from [XML index tables]
    where [node is root node])  = 'myNamespace'
```

In the above query statement, the ellipses denote unspecified syntax and the text between the brackets is psuedocode describing the function of code that should be used in place of bracketed text. The input to PATHID_GET_NAMESPACE (path ID) is the path id column of the path table.

In an embodiment of the present invention, functional indexes may be created for the path id column of the path table, where the functional indexes are based on either PATH_GET_NAME (path ID) and PATHID_GET_NAMESPACE (path ID). The functional indexes enable more efficient computation of queries in some scenarios, such as computation of queries with filter and join predicates based on the functions.

Illustrative Name/Name Space Generation Procedure based on Path Id

Figure 3:
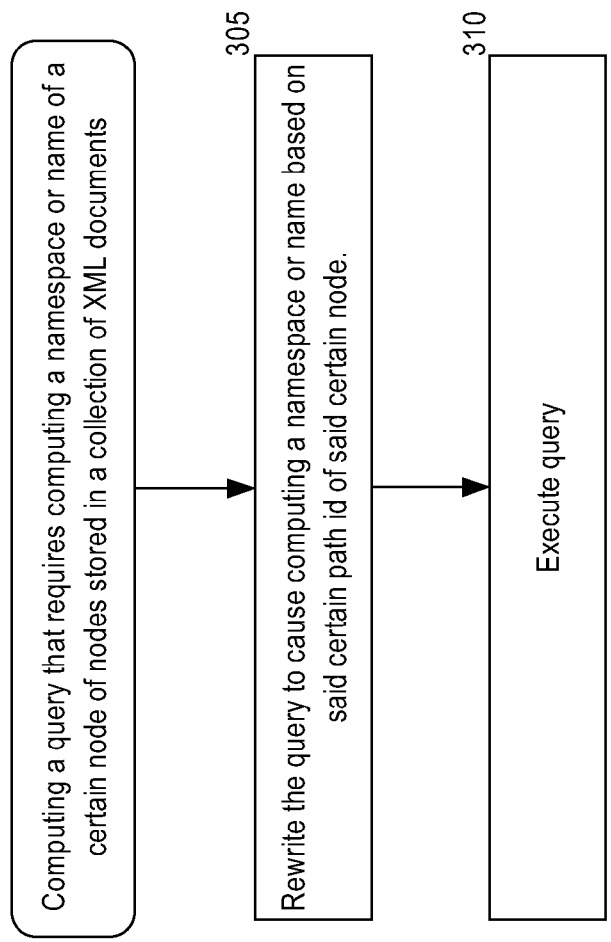
FIG. 3 is a flow chart illustrating a procedure for computing a query that requires computing a namespace or name of a node in a XML document, according to an embodiment of the present invention.

FIG. 3 is a flow chart illustrating a procedure for computing a query that requires computing a namespace or name of a certain node of nodes stored in a collection of XML documents, according to an embodiment of the present invention. Referring to FIG. 3, at 305, rewrite the query to cause computing a namespace or name based on said certain path id of said certain node. At 310, execute the query.

Hardware Overview

Figure 2:
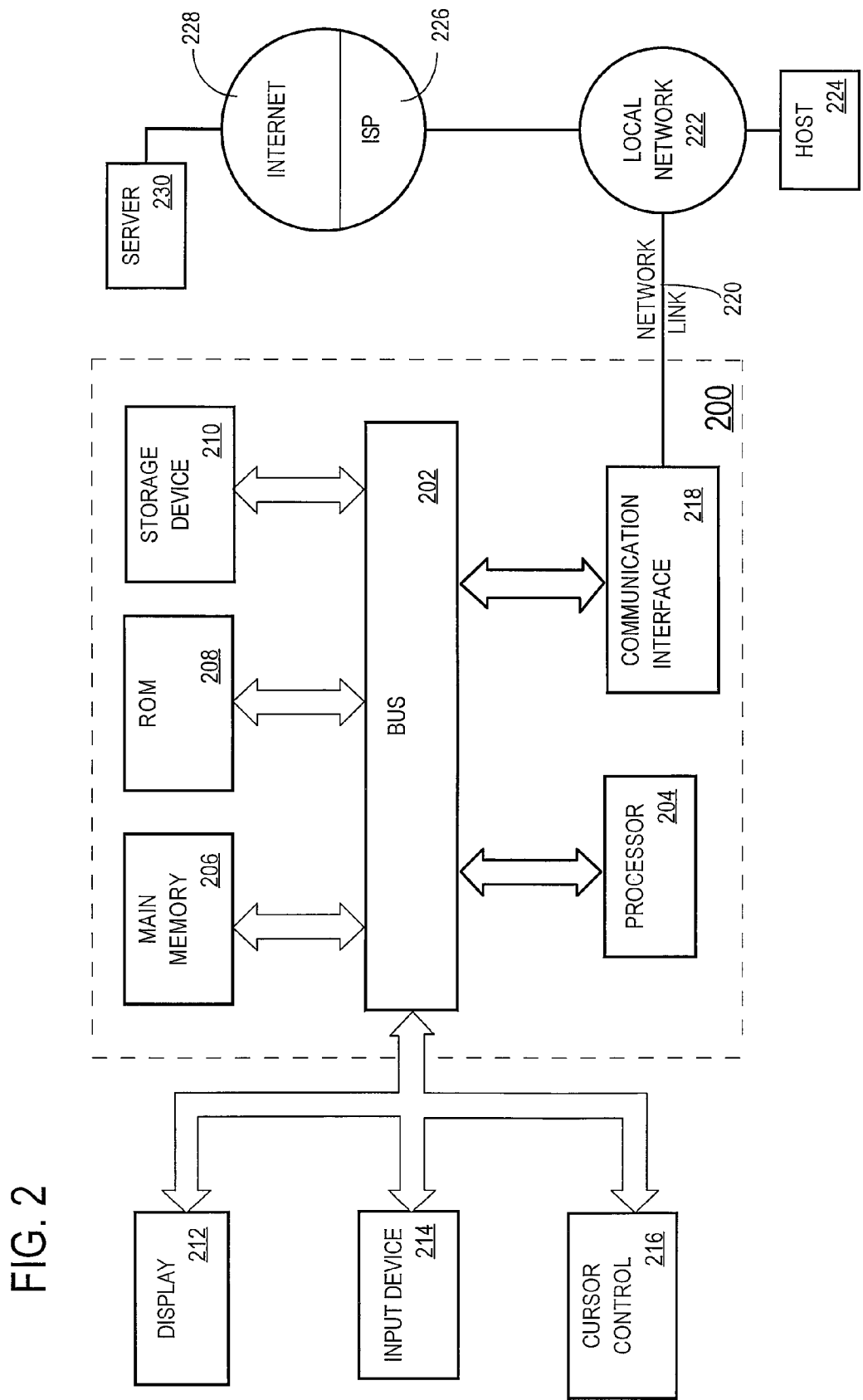
FIG. 2 is a diagram of a computer system that may be used in an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
computing a query that requires computing at least one of a namespace and name of a certain node of nodes stored in a collection of XML documents;
wherein each node of said nodes is associated with a path and a path id, said path id of said each node being based on one or more tokens, each token of said one or more tokens representing at least one of a name and namespace of said each node or of an ascendant node of said each node;
wherein a first table includes rows, each row of said rows corresponding to a node of said nodes in said collection of XML documents;
wherein said first table includes a first column that holds the path ids of said nodes; and
wherein computing said query includes rewriting said query to cause computation of said at least one of a namespace and name of said certain node based on said certain node's path id that is stored in said first column.

2. The computer-implemented method of claim 1,
wherein said query before said rewriting said query does not reference said first table.

3. The computer-implemented method of claim 2, wherein rewriting said query includes incorporating a function that computes said at least one of a namespace and name based on said first column.

4. The computer-implemented method of claim 3,
wherein a particular table maps, for each node of said nodes, a token value to at least one of the namespace or name of said each node; and
wherein evaluation of the function causes determining the at least one of the namespace and name of said certain node based on the particular table and the path id of said certain node.

5. The computer-implemented method of claim 1,
wherein a particular table maps, for each node of said nodes, a token value to at least one of the namespace or name of said each node; and
wherein computation of said at least one of a namespace and name of said certain node based on said certain node's path id includes determining, based on the particular table and said certain node's path id, the at least one of the namespace and name of said certain node.

6. A computer-implemented method, comprising:
computing a query that requires computing at least one of a namespace and name of a certain node of nodes stored in a collection of XML documents;
wherein each node of said nodes is associated with a path and a path id, said path id of said each node being based on one or more tokens, each token of said one or more tokens representing at least one of a name and namespace of said each node or of an ascendant node of said each node;
wherein a particular table maps, for each node of said nodes, a token value to at least one of the namespace and name of said each node; and
wherein computing said query includes rewriting said query to cause computation of said at least one of a namespace and name of said certain node based on the path id of said certain node, wherein said computation includes determining, based on the particular table and the path id of said certain node, said at least one of the namespace and name of said certain node.

7. The computer-implemented method of claim 6, wherein rewriting said query includes rewriting said query to incorporate a function that computes said at least one of a namespace and name based on the path id of said certain node, wherein evaluation of said function causes said determining, based on the particular table and the path id of said certain node, said at least one of the namespace and name of said certain node.

8. The computer-implemented method of claim 6, wherein a first table includes rows that each correspond to a node of said nodes in said collection of XML documents;
wherein said first table includes a first column that holds the path ids of said nodes, including the path id of said certain node;
wherein said query before said rewriting said query does not reference said first table; and
wherein rewriting said query includes rewriting said query to cause said computation of said at least one of a namespace and name based on said first column.

9. A non-transitory computer-readable storage medium storing one or more sequences of instructions which, when executed by one or more processors, causes the one or more processors to perform steps of:
computing a query that requires computing at least one of a namespace and name of a certain node of nodes stored in a collection of XML documents;
wherein each node of said nodes is associated with a path and a path id, said path id of said each node being based on one or more tokens, each token of said one or more tokens representing at least one of a name and namespace of said each node or of an ascendant node of said each node;
wherein a first table includes rows, each row of said rows corresponding to a node of said nodes in said collection of XML documents;
wherein said first table includes a first column that holds the path ids of said nodes; and
wherein computing said query includes rewriting said query to cause computation of said at least one of a namespace and name of said certain node based on a said certain node's path id that is stored in said first column.

10. The non-transitory computer-readable storage medium of claim 9,
wherein said query before said rewriting said query does not reference said first table.

11. The non-transitory computer-readable storage medium of claim 10, wherein rewriting said query includes incorporating a function that computes said at least one of a namespace and name based on said first column.

12. The non-transitory computer-readable storage medium of claim 11,
wherein a particular table maps, for each node of said nodes, a token value to at least one of the namespace or name of said each node; and wherein evaluation of the function causes determining the at least one of the namespace and name of said certain node based on the particular table and the path id of said certain node.

13. The non-transitory computer-readable storage medium of claim 9,
wherein a particular table maps, for each node of said nodes, a token value to at least one of the namespace or name of said each node; and
wherein computation of said at least one of a namespace and name of said certain node based on said certain node's path id includes determining, based on the particular table and said certain node's path id, the at least one of the namespace and name of said certain node.

14. A non-transitory computer-readable storage medium, comprising:
computing a query that requires computing at least one of a namespace and name of a certain node of nodes stored in a collection of XML documents;
wherein each node of said nodes is associated with a path and a path id, said path id of said each node being based on one or more tokens, each token of said one or more tokens representing at least one of a name and namespace of said each node or of an ascendant node of said each node;
wherein a particular table maps, for each node of said nodes, a token value to at least one of the namespace and name of said each node; and
wherein computing said query includes rewriting said query to cause computation of said at least one of a namespace and name of said certain node based on the path id of said certain node, wherein said computation includes determining, based on the particular table and the path id of said certain node, said at least one of the namespace and name of said certain node.

15. The non-transitory computer-readable storage medium of claim 14, wherein rewriting said query includes rewriting said query to incorporate a function that computes said at least one of a namespace and name based on the path id of said certain node, wherein evaluation of said function causes said determining, based on the particular table and the path id of said certain node, said at least one of the namespace and name of said certain node.

16. The non-transitory computer-readable storage medium of claim 14, wherein a first table includes rows that each correspond to a node of said nodes in said collection of XML documents;
wherein said first table includes a first column that holds the path ids of said nodes, including the path id of said certain node;
wherein said query before said rewriting said query does not reference said first table; and
wherein rewriting said query includes rewriting said query to cause said computation of said at least one of a namespace and name based on said first column.

* * * * *

UNITED STATES PATENT AND TRADEMARK OFFICE
CERTIFICATE OF CORRECTION

PATENT NO. : 8,407,209 B2
APPLICATION NO. : 12/178368
DATED : March 26, 2013
INVENTOR(S) : Chandrasekar et al.

It is certified that error appears in the above-identified patent and that said Letters Patent is hereby corrected as shown below:

In the Specification:

In column 3, line 13, delete "and or" and insert -- and/or --, therefor.

In column 4, line 52, delete "psuedocode" and insert -- pseudocode --, therefor.

In the Claims:

In column 8, line 53, in Claim 9, delete "on a" and insert -- on --, therefor.

Signed and Sealed this
Ninth Day of July, 2013

Teresa Stanek Rea
*Acting Director of the United States Patent and Trademark Office*